UNITED STATES PATENT OFFICE.

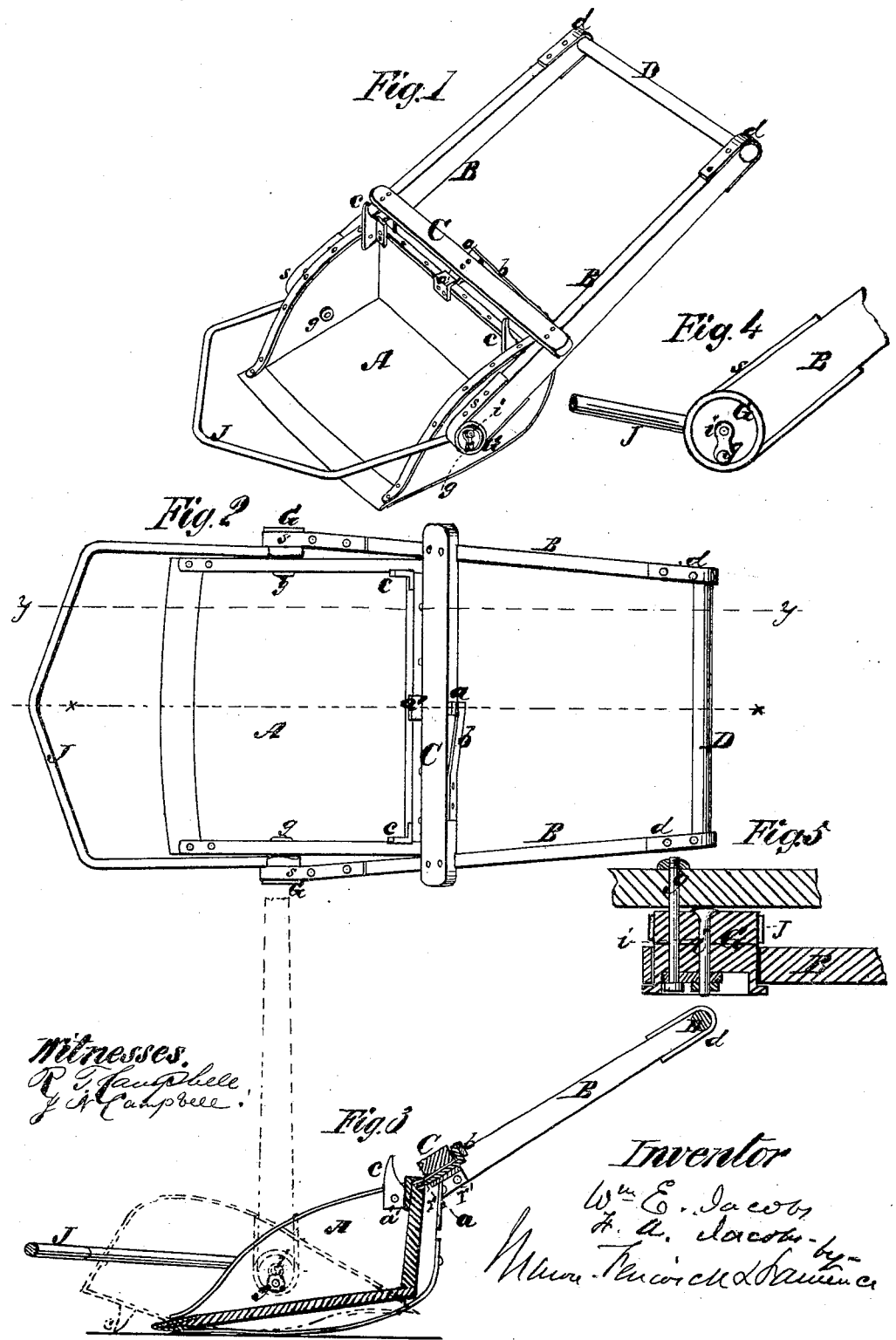

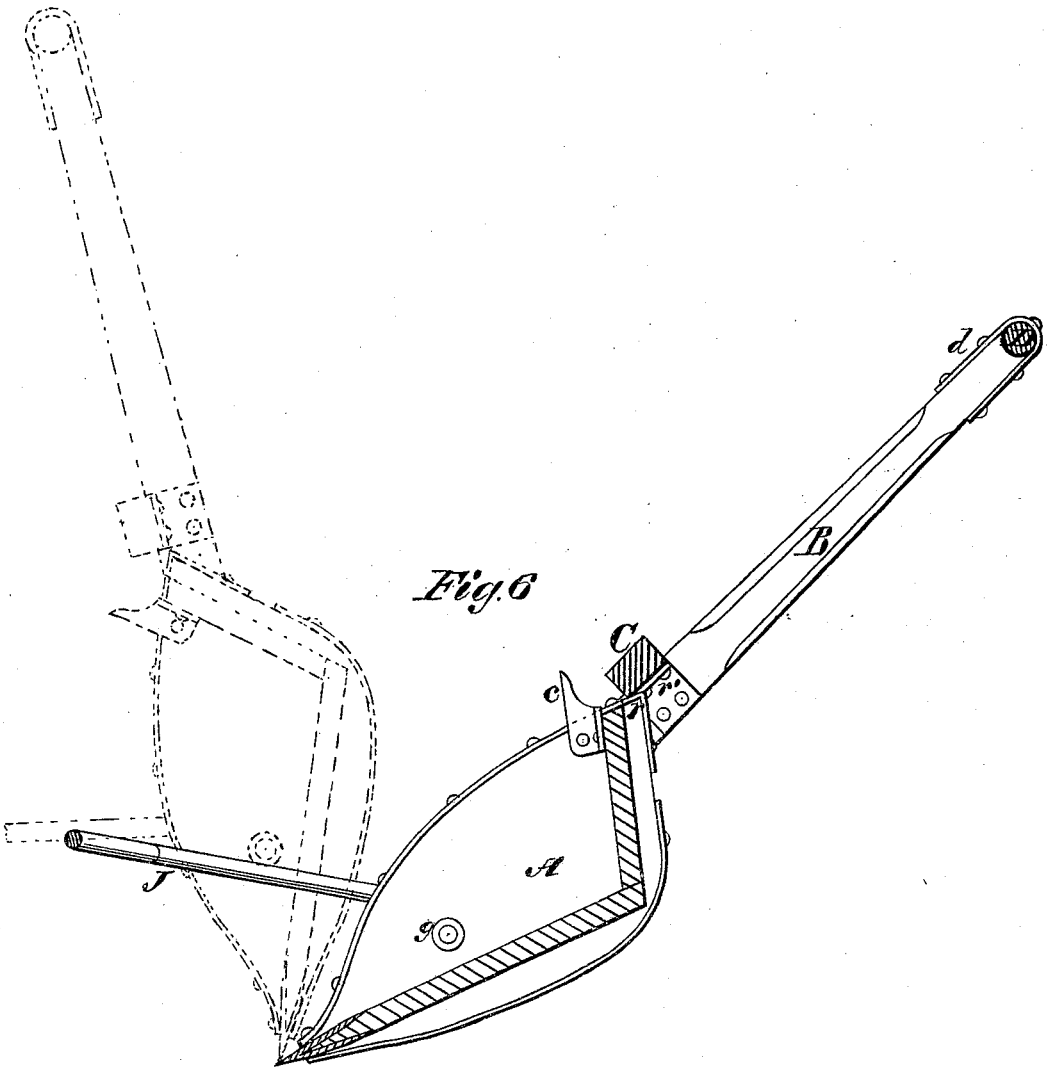

WILLIAM E. JACOBS AND FELIX A. JACOBS, OF COLUMBUS, OHIO.

IMPROVEMENT IN SCRAPERS.

Specification forming part of Letters Patent No. 143,016, dated September 23, 1873; application filed July 5, 1873.

*To all whom it may concern:*

Be it known that we, WILLIAM E. JACOBS and FELIX A. JACOBS, both of Columbus, in the county of Franklin and State of Ohio, have invented a new and Improved Earth-Scraper; and we do hereby declare that the following is a full, clear, and exact description thereof, reference being had to the accompanying drawings making part of this specification, in which—

Figure 1, Plate 1, is a perspective view of the scraper complete. Fig. 2, Plate 1, is a top view of the same. Fig. 3, Plate 1, is a section taken longitudinally and vertically through the scraper in the plane indicated by dotted line $x\ x$, Fig. 2. Figs. 4 and 5, Plate 1, are views in detail, showing the manner of pivoting the bowl to its handles and bail. Fig. 6, Plate 2, is a section through Fig. 2 in the plane indicated by dotted line $y\ y$ thereon.

Similar letters of reference indicate corresponding parts in the several figures.

This invention relates to revolving road or earth scrapers, and has for its object pivoting the bail and handles to the bowl by eccentrics, which, when the handles are thrown up, will release the back part of the bowl from a cross-bar on the handles, and allow the bowl to revolve and dump its load, after which the bowl will be again arrested by said cross-bar and a spring-latch, and thus held in position for gathering another load, as will be hereinafter explained.

In the accompanying drawings, A represents the scraper-bowl, which is made of the usual well-known shape and of suitable size, with its sides extended back, as shown at $r$, Fig. 6, for a purpose hereinafter explained. B B represent the handles of the scraper, which are connected to the sides of the bowl A by means of eccentrics G G; and J represents the bail to which the horse is hitched, the rear ends of which bail have the eccentrics G G rigidly secured to them by means of bolts or rivets $i$, shown clearly in Figs. 4 and 5. The eccentrics G G are flanged, and are allowed to turn freely about pins $g\ g$, which are fixed to and project from the sides of the scraper-bowl. These pins $g$ are placed eccentrically with respect to G G. The front ends of the handles are connected loosely to the eccentrics by means of straps $s\ s$, which embrace the peripheries of the eccentrics, and are secured rigidly to the upper and lower edges of the handles, as shown on plate 1 of the drawings. C represents a cross-bar, which is secured to the handles B B at such a distance back of the pivots $g\ g$ that when the handles B B are in a position shown in Figs. 1, 3, and 6, in full lines, the rear extensions $r\ r$ of the sides of the bowl A will lie beneath the bar C and against plates $r'\ r'$ fixed thereto, thereby preventing the bowl from turning forward while gathering the load. In the center of the bar C is a longitudinally-sliding latch, $a$, having an under beveled catching end, and acted on by a spring, $b$. This latch $a$ is intended to engage with a beveled catch, $a'$, which is on the upper edge of the back board of the scraper-bowl, and when so engaged the latch will prevent the back part of the bowl from turning back, or in other words allow the back part of the bowl to be lifted by the handles. At the rear ends of the handles B is another cross-bar, D, the ends of which are secured to the handles by means of straps $d$, as shown in the drawings. At the rear corners of the bowl A are two spur-shaped pieces, $c\ c$, which are rigidly secured to the bowl, and intended to engage with the ground when the bowl is upset, as indicated by dotted lines, Fig. 3, and assist in turning the bowl back to an upright position.

It will be seen from the above description that while the bowl is gathering up earth it is held fast to the cross-bar C of the handles B by means of the extensions $r\ r$ and the latch $a$, the handles and bowl being held in about the position represented by Figs. 1, 3, and 6 in full lines.

When it is desired to upset the bowl and discharge the gathered load therefrom, the person having hold of the cross-bar D at the rear ends of the handles throws the latter up to about the position indicated by dotted lines, Fig. 6, which operation brings the eccentrics into play, and causes them to move the cross-bar C away from the extensions $r\ r$ of the bowl A, thereby allowing the bowl to turn over and discharge its load. The handles are then drawn back and the horse driven on, when the spurs $c\ c$ will engage with the ground, and the bowl will be brought back to a working position, and there arrested by the cross-bar C and latch a for gathering another load.

The cross-bar C is thus made to serve as a firm and substantial holding-down bar for the back end of the bowl while the latch on this bar serves to hold up the bowl.

It will be noticed that the spurs c c are constructed in a form which enables them to aid in holding the inside corners of the bowl together. They thus perform the office of turning over the bowl and of strengthening and protecting the bowl at the points where it would be liable to give out. It will also be noticed that our catch and latch with the cross-bar answers the important purpose of firmly holding the scraper-bowl down, the combination affording two rests for this purpose and one for raising. It also operates automatically, and therefore is a very convenient and useful attachment for revolving scrapers of the kind shown, and others which require to be firmly held down and readily released.

Having described our invention, what we claim as new, and desire to secure by Letters Patent, is—

1. A revolving scraper-bowl, having its handles B B and bail J connected to its sides by means of eccentrics G G, in combination with extensions r r, the holding-down bar C and a holding-up latch, a, substantially as described.

2. The spring-latch a, located, as shown, upon the cross-bar C, in combination with the beveled catch a' on the revolving scraper-bowl, substantially as specified.

WILLIAM E. JACOBS.

Witnesses:
FELIX A. JACOBS.
H. L. JACOBS,
J. D. SULLIVAN.